US006032085A

United States Patent [19]
Laurent et al.

[11] Patent Number: 6,032,085
[45] Date of Patent: Feb. 29, 2000

[54] METHOD OF FORMING AN ELECTRONIC POCKET PILLBOX AND PRESCRIPTION-WRITING APPARATUS USED IN THE METHOD

[75] Inventors: Hervé Laurent, Paris; Eric Jarousse, Saint Ay; Valérie Oriol, Miribel, all of France

[73] Assignee: Biostat S.A., Levallois-Perret, France

[21] Appl. No.: 09/041,822

[22] Filed: Mar. 12, 1998

[51] Int. Cl.[7] ...................... G06F 17/00
[52] U.S. Cl. ...................... 700/242; 221/2; 221/7
[58] Field of Search ...................... 364/479.12, 479.14; 221/2, 7, 4, 5, 197; 235/375, 487

[56] References Cited

U.S. PATENT DOCUMENTS

| | | | |
|---|---|---|---|
| 4,473,884 | 9/1984 | Behl | 364/479.12 |
| 4,695,954 | 9/1987 | Rose et al. . | |
| 4,785,969 | 11/1988 | McLaughlin . | |
| 4,905,213 | 2/1990 | Masse et al. . | |
| 4,962,491 | 10/1990 | Schaeffer | 221/2 |
| 5,181,189 | 1/1993 | Hafner | 221/2 |
| 5,200,891 | 4/1993 | Kehr et al. | 364/479.12 |
| 5,826,217 | 10/1998 | Lerner | 364/479.12 |
| 5,850,937 | 12/1998 | Rauche | 221/2 |
| 5,915,558 | 6/1999 | Girvetz | 206/534 |

FOREIGN PATENT DOCUMENTS

| | | |
|---|---|---|
| 0298627 | 11/1989 | European Pat. Off. . |
| 2585151 | 7/1985 | France . |
| 2599252 | 5/1986 | France . |
| 2099803A | 12/1980 | United Kingdom . |
| WO94/04966 | 3/1994 | WIPO . |

*Primary Examiner*—Donald P. Walsh
*Assistant Examiner*—Khoi H. Tran
*Attorney, Agent, or Firm*—Lowe Hauptman Gopstein Gilman & Berner

[57] ABSTRACT

An electronic pocket pillbox having multiple detachable compartments each fitted with a unit-medication dispenser for different medication sizes and pharmaceutical forms is formed by a physician writing a prescription with a computer having a display and responsive to a keyboard and mouse. The computer codes and loads a prescription file into a memory of a detachable data medium, similar to a smart card. The card is put into the pillbox to supply signals to electronic circuitry in the pillbox. Each pillbox compartment is filled by a pharmacist with a number of pills of a type defined by the prescription. The pharmacist assembles the compartments to form the pillbox. The pillbox electronic circuitry responds to the detachable data medium memory to derive medication alarm signals to advise a pillbox user to take the medication.

8 Claims, 5 Drawing Sheets

METHOD OF FORMING AN ELECTRONIC POCKET PILLBOX AND PRESCRIPTION-WRITING APPARATUS USED IN THE METHOD

FIELD OF INVENTION

The present invention relates to a method of forming an electronic pocket pillbox and more particularly to a method of and apparatus for writing a prescription into a memory of a detachable data medium.

BACKGROUND ART

French patent 2,692,689 discloses a medical-aid procedure using a measuring apparatus where an operational program, designed to control in an automated manner the operation of an apparatus, is loaded on a detachable data medium. Apparatus operation is initiated by readout of this operational program which includes an automatic initializing phase of a sequence of operations carried out on the basis of apparatus adjustment parameters. Such apparatus is useless for pillboxes because if it were used for pillboxes, it would require a physician to (1) master operation of the pillbox or (2) have copies of operational programs to match each patient.

European patent application 554,137 discloses a pocket pillbox apparatus including a medication loader. The apparatus requires expert programming of a pillbox microprocessor to match the pillbox to a specific dosage constraint. This pillbox is restricted to one kind of medication for each loader and requires expert microprocessor programming for each dosage change. Further, the apparatus can not be simply programmed and appears to require special knowledge on the part of the pharmacist.

French patent application 2,585,151 discloses a portable apparatus for memory and data retrieval to be used as a prescription record. A pharmacist at a desk programs into a package the contents of a prescription including the names of the medications, time or frequency of medication ingestion, medication dosages and medication antagonisms. However, the memory programming apparatus, which is specifically dedicated to programming this kind of prescription record, comprises a data-input keyboard fitted so it records prescriptions and has special function keys specifically for (1) the specific times of ingestion, morning, noon and evening, lunch, dinner, etc., and (2) the time intervals between medication ingestion. A memory package, used solely to store the prescription, signals the ingestion times and medication dosages, and interacts with a memory display. Such apparatus precludes guiding the patient and does not eliminate the confusion the patient may have with regard to different medications, and does not allow checking that the prescription has been followed. The programming system requires specific apparatus and consequently programmer apprenticeship, by a pharmacist who assembles the prescription. Consequently, there is a possibility of deviation between the physician's prescription and the pharmacist's programming due, for instance, to programming errors by the pharmacist.

SUMMARY OF THE INVENTION

A first object of the invention is to provide a new and improved, simple and effective method of and apparatus for forming an electronic pocket pillbox, wherein a physician prepares a prescription, a pharmacist responds to the prescription to configure the pillbox and a patient follows the prescription.

This objective is attained by forming an electronic pocket pillbox having plural detachable compartments fitted with a medication unit-dispensing component adaptable to different pharmaceutical forms and various sizes. The method includes using a computer input device to write prescription data into a computer. The computer responds to the prescription data and signals from the input device to code and load a prescription file onto a detachable data medium. Each compartment of the pillbox is filled with a number of medications of one type defined in the prescription. The compartments are assembled together and the detachable data medium is inserted into the pillbox.

Preferably, a gauge which matches the medication intended to fill the pillbox compartment is installed in the dispensing component of each compartment.

In another feature of the invention, the prescription file contained in the detachable data medium is copied into the pillbox prescription memory.

In yet another feature of the invention, the pharmacist edits the instructions to indicate a compartment number for each pertinent medication and the size of a gauge he inserts into the dispenser of each compartment.

As another feature of the invention, coding and loading of the prescription file is initiated by selecting the function "pillbox programming" in a menu displayed on a data processing system.

Another objective of the invention is to provide a new and improved apparatus for preparing a prescription by programming an electronic pillbox memory and offering ergonomics of interest to a physician so the physician does not need to have any electronic or data processing know-how or the need to operate an electronic pillbox including the prescribed medication.

This objective is achieved by a prescription-writing apparatus including a computer fitted with a display and at least one input device for introducing data and selecting data displayed on the display. The computer is arranged to manage the display to generate a window having a menu bar and at least one sub-window, i.e., a pane, composed of several text areas and a menu area allowing a user to select a sorting function for the objects of at least one database in relation to criteria displayed in a text area of the pane.

In another feature of the invention, a window containing an icon bar is used to control a data processing system including the computer and manage the file.

In another feature of the invention, the input device enables a pointer to be displayed on a drop-down list of objects so data relating to the selected object and contained in the fields can be introduced into corresponding text areas of the pane.

In another feature of the invention, the criteria displayed in the text area are the first letters of a medication type and the database includes objects that are the commercial names of the medications. The fields include companies which make the medications and the pharmaceutical presentation form.

As another feature of the invention, the list of medications corresponding to the criteria displayed in the first text area appears in a drop-down list displayed in an additional zone of the window.

In accordance with another feature of the invention, one criterion displayed in a text area is a name of the medication of the database, and the database has fields including the number of withdrawals in a dose, time units, the days of the week when the medication is to be taken, and the withdrawal times of the medications from the compartments.

In another feature of the invention, the computer has a first database for medications, a second database for dosages, and the input device interactive means allows a pointer to be moved to the menu of the database the operator wishes to select.

In another feature of the invention, selection of the database triggers a "sort" function if a text area associated with the pane is partly filled.

In another feature of the invention, the computer carries out a consistency check on the medication withdrawal time as stored in the memory of the detachable data medium during pillbox use to determine if the pillbox user dispensed medications under emergency conditions.

In another feature of the invention, the computer encodes the prescription before it is stored in the detachable data medium and edits a data file which, for each medication, contains indicia representing the kind of gauge to be placed in the pillbox dispenser, while searching in a third database for data contained in the "gauge" field of the prescribed medication of this database.

The above and still further objects, features and advantages of the present invention will become apparent upon consideration of the following detailed description of one embodiment thereof, especially when taken in conjunction with the accompanying drawings.

DESCRIPTION OF THE PREFERRED EMBODIMENT

Figure 1:
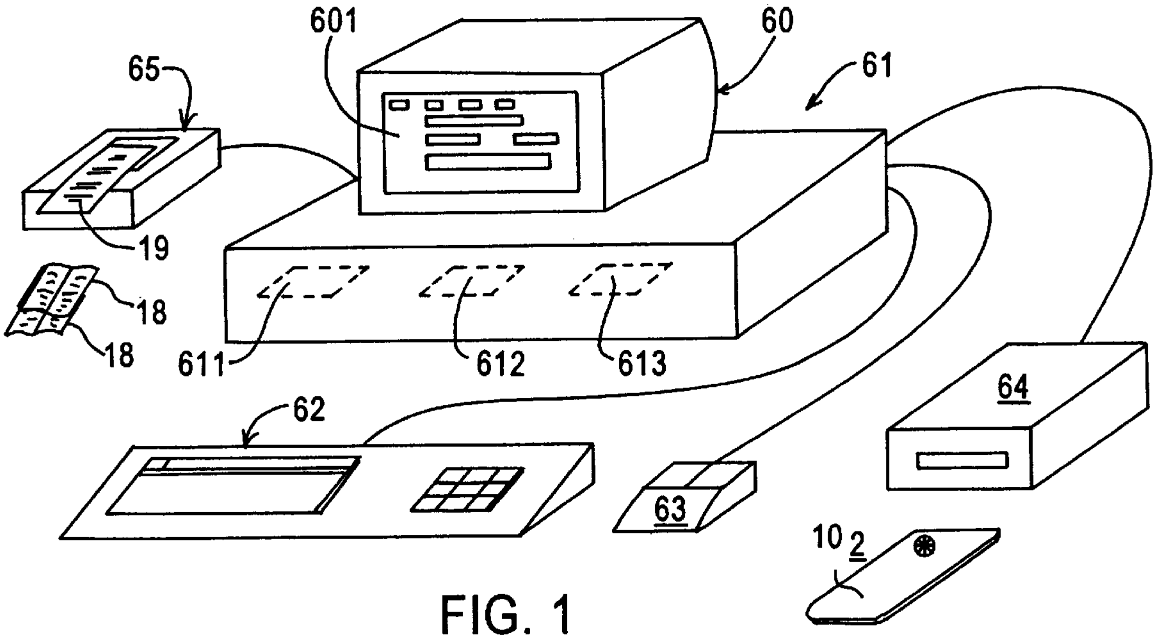
FIG. 1 is a perspective of a data processing apparatus for writing a prescription in accordance with a preferred embodiment of the method of the invention.

The prescription-writing apparatus of FIG. 1 includes personal computer 61 comprising display screen 60. Computer 61 is connected to input/output devices including keyboard 62, a mouse 63, a printer 65 and read-write unit 64, forming an interface between computer 61 and chip card 2 constituting a detachable data medium. Card 2 has the same size as a credit card and includes a microprocessor, internal bus, a non-volatile electronically erasable programmable memory (EEPROM), a random access memory (RAM) and a read-only memory (ROM), as disclosed in the co-pending application filed concurrently herewith entitled "A Multi-Compartment, Electronic Pocket Pillbox," (Lowe Hauptman Gopstein & Berner docket 1013-006) and incorporated by reference herein. Computer 61 includes a memory holding three databases. A first database 611 constitutes a "medication" database reproducing pharmaceutical data stored in the *Physicians Desk Reference Manual* (the PDR). A second database 612 stores "dosages" and contains typical dosages of the most common medications and enables the user of computer 61 to create specific dosages. A third database 613 constitutes a tabular correspondence between the sizes and geometries of medications and sizes of gauges 172 (FIG. 6) to be inserted into compartments of the pillbox. These three databases are initially loaded into computer 61 when prescription-writing software is installed in the computer memory.

Figure 2A:
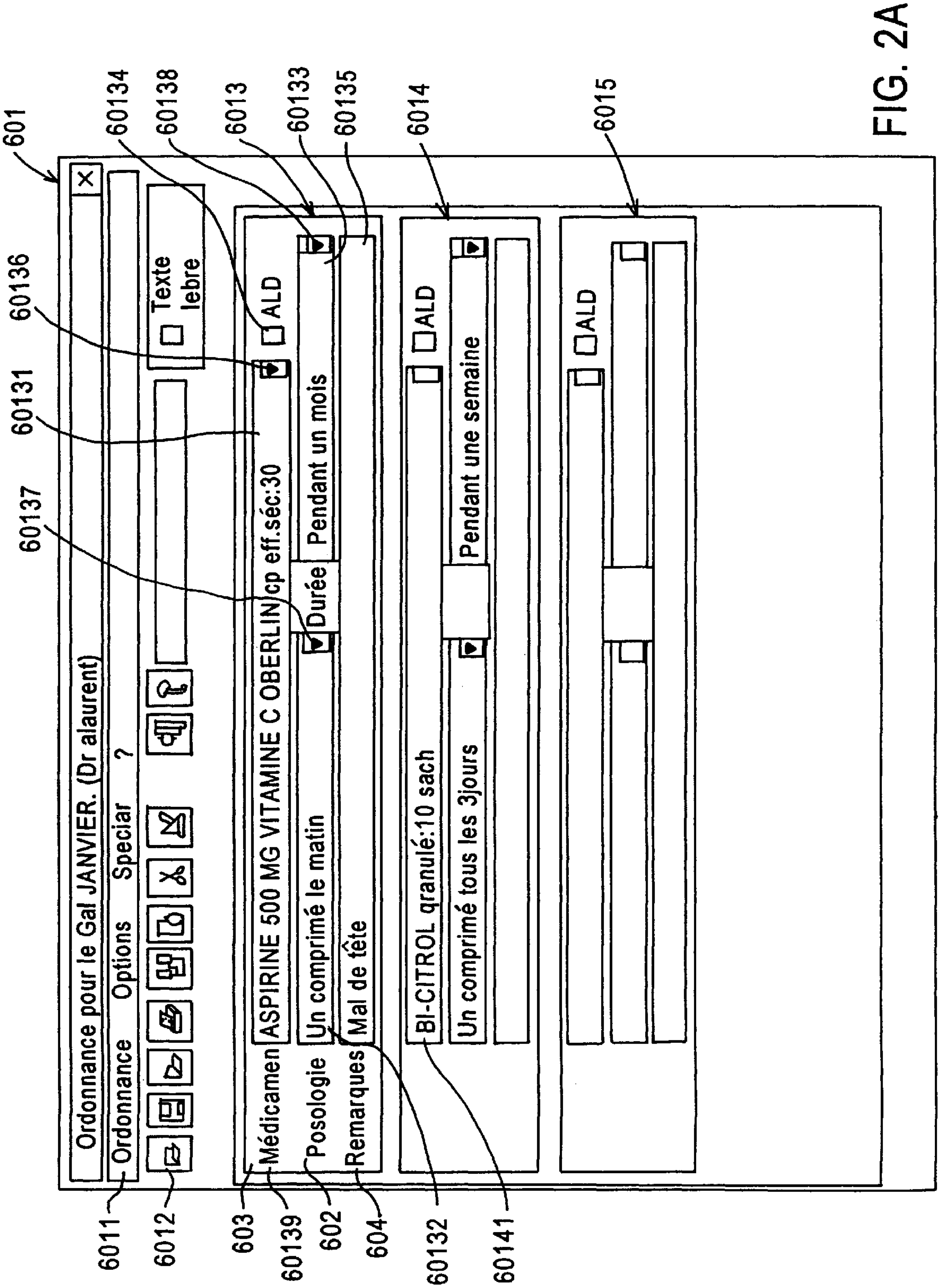
FIG. 2A is a view of the display screen of FIG. 1 during initiation of the program for writing the prescription.

The prescription-writing software of computer 61 comprises a module allowing management of signals from read-write unit 64 to permit data introduced by the user and coded by the software to be written into the chip card 2 via the read-write unit and to transfer data stored in a memory of card 2 to the memory of computer 61. The software of computer 61 also includes a display-interface module allowing management of the screen display and transmission of data and the required control signals to display windows on screen 60. A first display window 601 on screen 60 allows a user of the apparatus of FIG. 1 to write a prescription. As shown in FIG. 2A, display window 601 comprises a menu bar 6011 and an icon bar 6012 including icons representing the various functions available to manage the computer screen, files and printer. These icons are the same type as used in WINDOWS displays.

The portion of window 601 underneath menu bars 6011 and 6012 is divided into several vertically stacked panes 6013, 6014 and 6015. Pane 6013 is split into several text boxes, i.e., areas; the first text box 60131 allows a user of keyboard 62 to introduce the name of a medication to be taken by a particular patient. Text box 60131 is associated with arrow 60136 assuring the display of a drop-down list of medication corresponding to the first letters introduced by the keyboard user into the text box. Text box 60131 also can be filled by the user moving mouse 63, which in turn moves a visual indicator such as an arrow of a highlighted area. The arrow is moved on a menu pane 60139 having three selection functions for three different databases, namely first database 603 for "medication" data, a second database 602 for the "dosage" data and a third database 604 for remarks.

Pane 6013 also comprises a second text box 60132 allowing the user of keyboard 62 or mouse 63 to enter medication dosages into computer 61. The pointer, if used selects the "dosages" database by the user positioning the pointer on the dosages menu; the user confirms this selection by an interactive means such as mouse 63. This action produces a second window, FIG. 3, containing a typical dosage of the medication set forth in panel 6013. Arrow 6037 associated with second text box 60132 causes simultaneous display of a drop-down list which makes it possible to choose the most conventional dosages when selection of the "dosages" database is not desired.

Lastly, selection of the "dosages" database allows either (1) the data concerning the conventional dosage of the flagged medication to be supplied directly to the prescription or (2) creation of a specific dosage in the prescription. A specific dosage is created if, for instance, the name stated in the first text box 60131 corresponding to the medication name does not correspond to a designation in the "dosages" database. This generating function is described below in connection with FIG. 3.

Next the computer user fills a third text box 60133 which states the time interval of medication ingestion. Text box 60133 is filled either by using keyboard 62 or by selection from a drop-down list that is selectively displayed by moving a pointer associated with mouse 63 to arrow 60138 associated with the text box; the user confirms selection of the drop-down list with mouse 63. The drop-down list displays the list of conventional treatment durations. The user can move a pointer, such as text highlighting, through this list and confirm a duration; for instance the duration is highlighted by mouse 63 to make the selected and confirmed durations appear in the third text box.

A fourth zone, associated with button 60134, is used to show that the selected prescription relates to a long-term syndrome (ALD). The fourth zone is selected by moving the interactive pointer to the 4th zone; e.g., the 4th zone is confirmed by clicking mouse 63.

Pane 6013 of FIG. 2A comprises a last text box 60135. After first pane 6013 has been filled, the data processing system of computer 61 causes screen 60 to display a second pane 6014 (FIG. 2A) having the same characteristics and permitting the same data entries as pane 6013.

As panes 6013, 6014 and 6015 are being filled by the user, the software of computer 61 causes a new pane to appear. When screen 60 is filled with panes, the panes shift, by the principle of drop-down lists to remove the display of the first created pane and replace it with the following medication pane to cause an empty pane to appear at the bottom of the screen. The data so entered are stored in the PAM of computer 61.

Figure 2B:
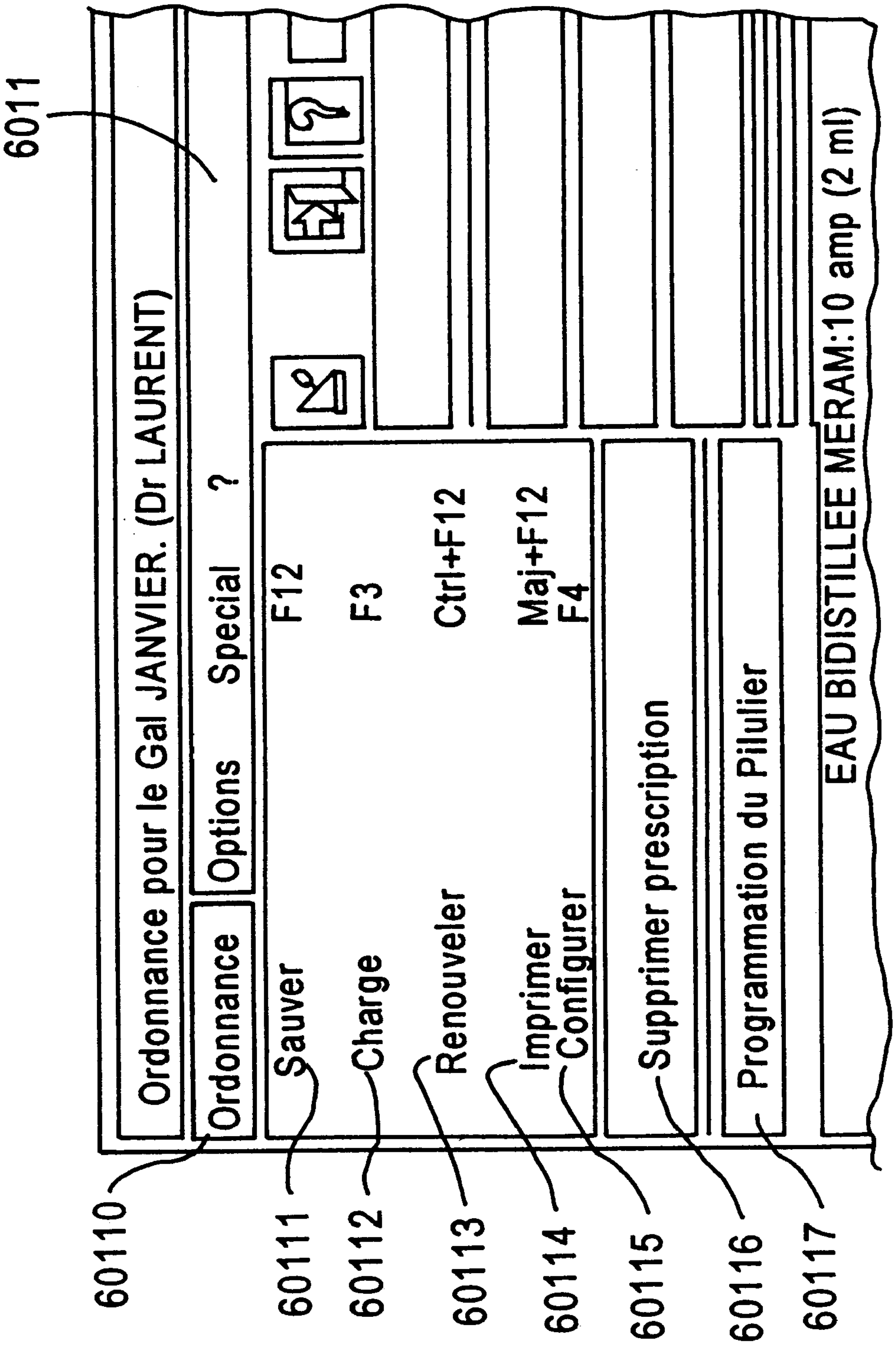
FIG. 2B is a view of different selectable functions of a menu for writing the prescription.

At the end of a write operation the data are written into the permanent memory (hard disk or diskette) of computer 61 by moving the pointer to the backup SAVE function 60111, (FIG. 2B). As soon as the user selects the software in computer 61, the computer causes a first window to appear on screen 60 before the prescription-writing windows appear. The final window enables the user of computer 61 to enter patient vital data, such as birth date, social security number, and prescription number as soon as the user selects the "create prescription" menu. The software was previously personalized during installation by screen 60 displaying the physician identification, address and all required information for Medicare or Medicaid. As shown in FIG. 2B, by selecting the "prescription" function, the menu bar allows triggering a menu block having several functions, namely "backup" 60111, "load" 60112 allowing loading a prescription, "renew prescription", "print" 60114, "configure" 60115 allowing entering of personal data, "suppress prescription" 60116 and pillbox "program" 60117 discussed below.

If the physician selects the pillbox "dosage" function, the software searches, in the "dosages" database, a medication corresponding to the names or characters introduced into the first text boxes 60131, 60141 of the prescription window. The "dosages" window display (FIG. 3) is filled with data related to dosages, provided such medication dosage information exists. Such dosage information is introduced into the prescription by enabling the "OK" button which replaces the "create" button of FIG. 3. In the opposite case, the software creates dosage information and causes a first "warning" block to appear in window 602 (FIG. 3); the warning block asks the physician if he wishes to create dosage information.

The remainder of window 602 (FIG. 3) is identical with what appears when the medication dosage information is extant, the only difference being that the text boxes are not filled with data constituting the dosage information and must be filled gradually by the physician.

Window 602 (FIG. 3) comprises in its "dosage" block a first text box 6020 where the dosage title is displayed, a second text box 6021*a* where the name of the medication type to which the dosage must be related is displayed. An arrow initiating drop-down list 6021*b* is associated with the second text box 6021*a*. Drop-down list 6021*b* displays a list of medication types wherein that medication which must be entered by the physician keyboard 6202 and is selected in the text box can be enabled by keyboard 62 or mouse 63.

Numerical box 6025*a* indicates the number of medication (pill) withdrawals by the patient from a pillbox. Block 6025*a* is associated with count-up and count-down arrows 6025*b* to increase and decrease the number of withdrawals depending on the arrow direction actuated by the pointer.

An additional numeric box 6022*a* shows how often, in time units, when pill withdrawal from the pillbox is to take place. The magnitude of the number in box 6022*a* is increased or decreased by up and down arrows 6022*b*. A text box 6023*a*, associated with numeric block 6022*a*, shows the selected time unit. To select one of several predetermined time units and introduce it into text box 6023*a*, activation arrow of drop-down list 6023*b* is selected to cause display of a drop-down list of the predetermined time units.

A third numeric box 6026*a* associated with up and down arrows 6026*b* causes display of the number of pills per withdrawal. Buttons 6026*c* and 6026*d* allow the physician to determine if such withdrawals must be timed relative to meal times.

Block 6027 enables the days of pill withdrawal to be established. Block 6027 comprises two buttons 60273 which determine whether the withdrawals are at fixed intervals or on variable days. Numeric box 60271 enables the frequency of the withdrawal days to be determined by displaying the numbers 1, 2, 3 etc. which respectively indicate a pill is to be taken every day, every second day, every third day etc.

By activating button 60272, associated with each day of the week, the day(s) of the week when the medication is to be released from the pillbox are established. Lastly "dosages" window 6021 (FIG. 3) comprises a "time of indigestion" block to select several ingestion times for each day corresponding to the pill release times of a required number of pills. The times are established in plural numeric boxes 60281*a*, each including a separate associated pair of up-down incrementing arrows 60281*b*.

Figure 3:
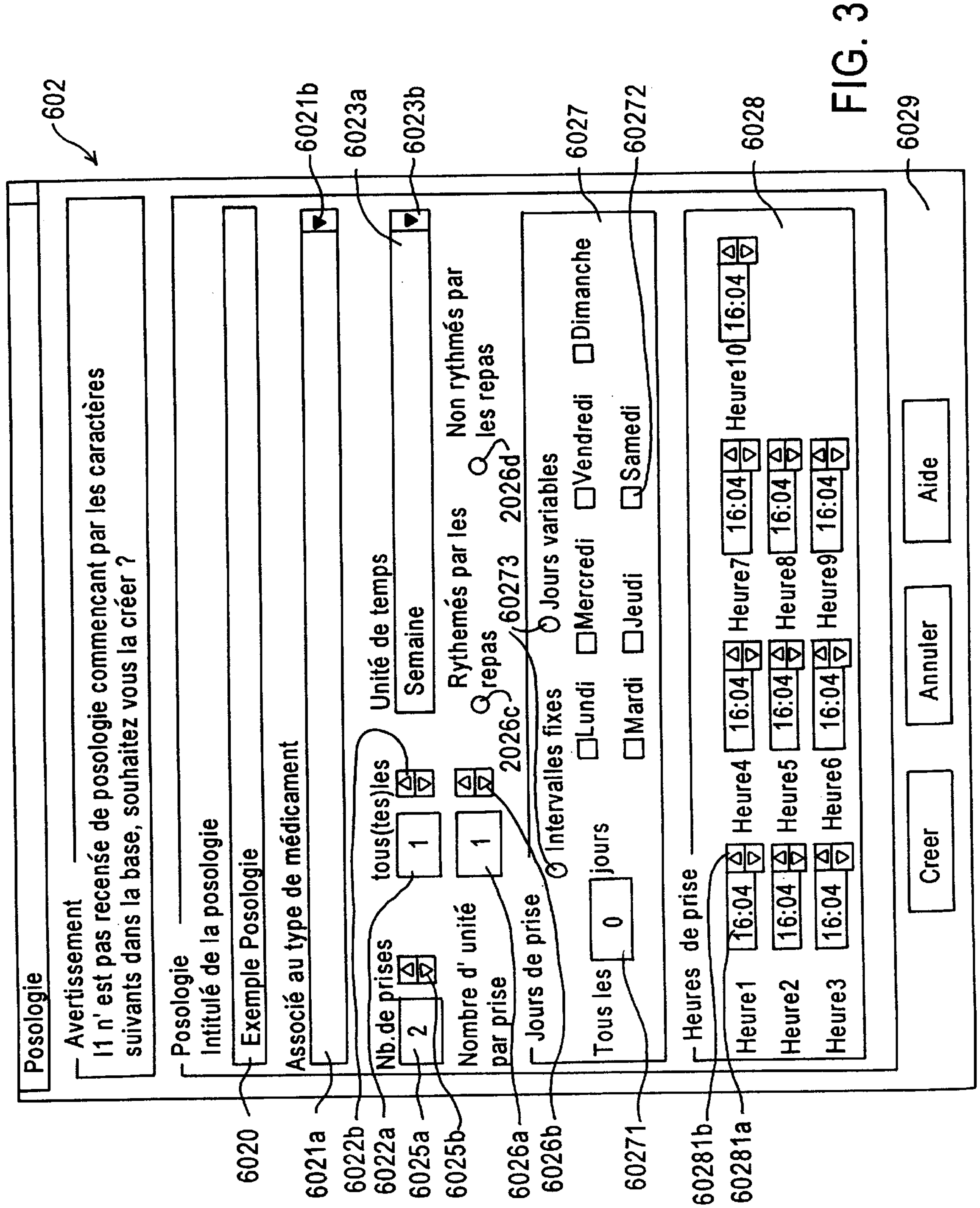
FIG. 3 is a view of the screen display when selecting a "dosage" function.

Window 602, FIG. 3, comprises a menu bar 6029 to allow the user of computer 61 to select a "create" button to confirm creation of the dosage information and cause the computer to record it in the "dosage" database. Menu bar 6029 also includes a "cancel" button to cancel the established dosage and a "help" button. The "create" function enables computer 61 to store data introduced into each of the text or numeric boxes. These data are stored in the corresponding fields of the "dosages" database.

When the user of computer 61 selects the "print" function 60114 from the menu bar 6011 (FIG. 2A) of the "dosages" window, printer 65 (FIG. 1) receives editing attributes and data to print on one hand a Medicare/Medicaid type prescription and on the other hand pillbox instruction file 19 (FIG. 1) for the pharmacist to start the pillbox. Pillbox-starting instruction file 19 printed by printer 65 includes different zones 18 separated by partitions 180, FIG. 7. File 19 sets forth the medication (pill) associated with each pillbox compartment, the number of pill units per withdrawal, the total number of pills corresponding to the treatment and the type of gauge 172 (FIG. 6) associated with the quantity of medication (i.e. number of pills) to be placed in the pillbox compartment. The type of gauge is stored in zones 181. Gauges 172 have the same size and shape as the different pills to be put into the different pillbox compartments. The information printed on file 19 is generated from data produced by the computer user (i.e. physician) on screen 60 and by using computer database 613 that establishes the correspondence between the number of pills to be taken, the names of the pills in the prescription and the gauge to be used for the pillbox.

After the physician inserts a blank chip card 2 into the interface terminal 64 he selects the notation "program pillbox" 60117 (FIG. 2B) from the create-prescription window to initiate operation of the "chip card program". During the "chip card program" the data stored in computer 61 as a result of programming the prescription are coded and written into the fields of an electronically erasable read-only non-volatile memory (EEPROM) of chip card 2.

The memory of chip-card 2 comprises a first file ORDO including the names of the fields listed below and data entered into the numeric or text boxes corresponding to the names of the fields of the windows of the prescription-writing program that are displayed on screen 60:

ORDO

| NAME OF FIELD | TYPE |
|---|---|
| Prescription # | number |
| Date of prescription | date/time |
| Name of medication | text |
| Channel # | number |
| Number of withdrawn units | number |
| Number of withdrawals/day | number |
| Times of issuance | memo |

Similarly, the data in Table PAT containing all information relating to the patient are transferred from the memory of computer 61 to the memory of chip card 2.

PAT

| NAME OF FIELD | TYPE |
|---|---|
| Patient's last name | text |
| Patient's first name | text |
| Patient's birth date | date/time |
| Patient's social security # | text |
| No. of prescription | number |
| Date of prescription | number |
| Number of days of treatment | number |
| Physician identification | text and/or number |
| Pillbox identification | number |
| Date of emergency access | date/time |
| Time of emergency access | date/time |

The dates and times of emergency access to the pillbox are loaded into the chip card memory each time the patient takes a pill from the pillbox during an emergency, (i.e. when the patient takes a pill from the pillbox out of the programmed pill taking sequence). The chip card memory is also loaded with the FONC operational table having the following fields as the patient uses the pills:

FONC

| NAME OF FIELD | TYPE |
|---|---|
| Prescription # | number |
| Date of prescription | date/time |
| Name of medication | number |
| Pillbox compartment | number |
| Date of emergency access | date/time |
| Number of units | number |
| Time of access | text |

Table FONC is filled only when electronic circuitry in the pillbox, described in the aforementioned copending application, detects an empty compartment in the pillbox.

Figure 4:
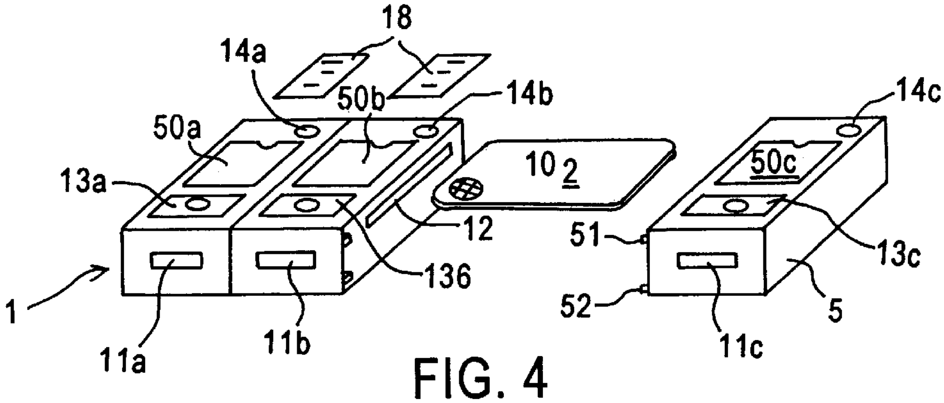
FIG. 4 is a perspective view of a modular pillbox for implementing the method of the invention.

The patient goes to the pharmacist with his prescription, his label sheet, an implementing sheet for the pharmacist and the chip card. The pharmacist assembles detachable compartments 5 (FIG. 4) of the pillbox on base element 1. Base element 1 includes two medication-dispensing compartments identical with the detachable compartments and the electronics required for operation of the pillbox, as well as a prescription memory. These circuits are described in detail in the aforementioned co-pending application. Depending on the number of prescribed medications, the pharmacist arranges the medications in each storage site 111 (FIG. 6) of each pillbox compartments 1 and 5.

The pharmacist places gauge 172 corresponding to the gauge designated in the instruction sheet through hood 16 into throat 1710 of rotary enclosure 171 situated in cylindrical well 17 communicating with storage space 111 (FIG. 6) in each compartment. Cover 16 of the enclosure hood is closed and then cover 15 of storage space 111 of the pillbox compartment is closed after the pharmacist puts the correct number of the prescribed pills in place.

Figure 6:
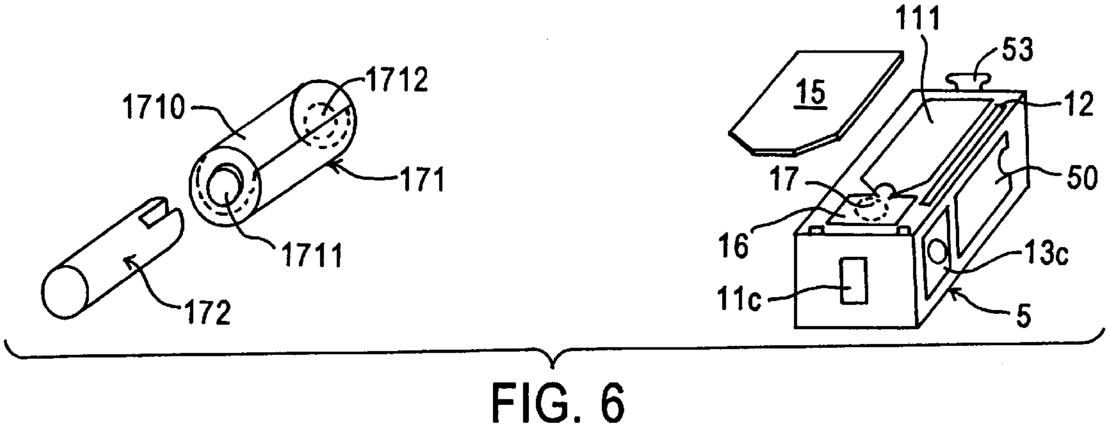
FIG. 6 is an exploded perspective view of a modular-pillbox compartment.
Figure 7:
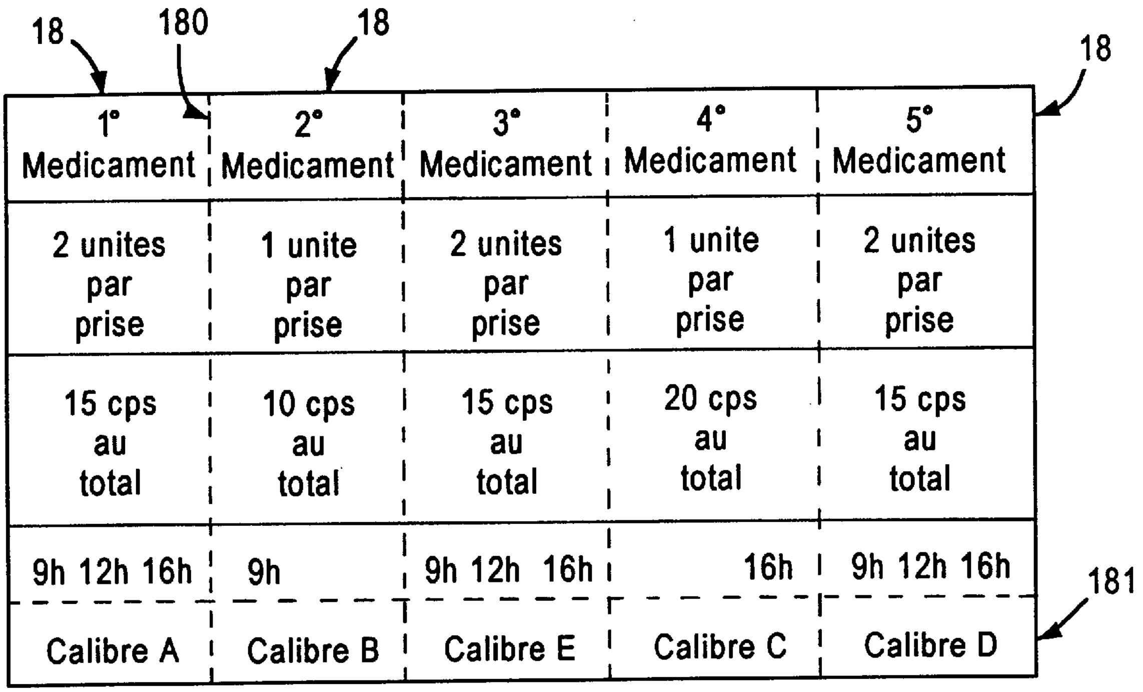
FIG. 7 is a diagram of an instruction file also serving as label.

Label 18, corresponding to the medication and to the number of pills deposited in the storage space, is put into transparent label window 50. After each pillbox compartment has been filled with the desired types and quantity of pills, as well as with the appropriate dispensing gauges 172, the patient's chip card 2 is inserted into slot 12 of base 1 and the additional compartments 5 are attached to the base compartment 1 by studs 51, 52 (FIG. 4) and locking strip 53 (FIG. 6). A portion of chip card 2 projecting from slot 12 of base 1 enters slot 12 on a wall of detachable compartment 5 abutting the main base compartment 1. The number of compartments required to allow issuance of all the prescribed pills is assembled in the stated manner by the pharmacist.

Each of the compartments 1 and 5 also comprises electric connectors so that on one hand it is possible using light emitting diodes (LEDs) 14*a*, 14*b*, 14*c* to signal to the pillbox user the compartment from which a medication is to be withdrawn. LEDs 14 are also activated in response to detecting the withdrawal and transit of pills from each compartment by sensing manual depression by the pillbox user of the dispensing button 13*a*, 13*b*, 13*c* associated with each of the compartments 1 and 5, causing the transit of each pill toward dispensing slots 11*a*, 11*b*, 11*c*.

Figure 5:
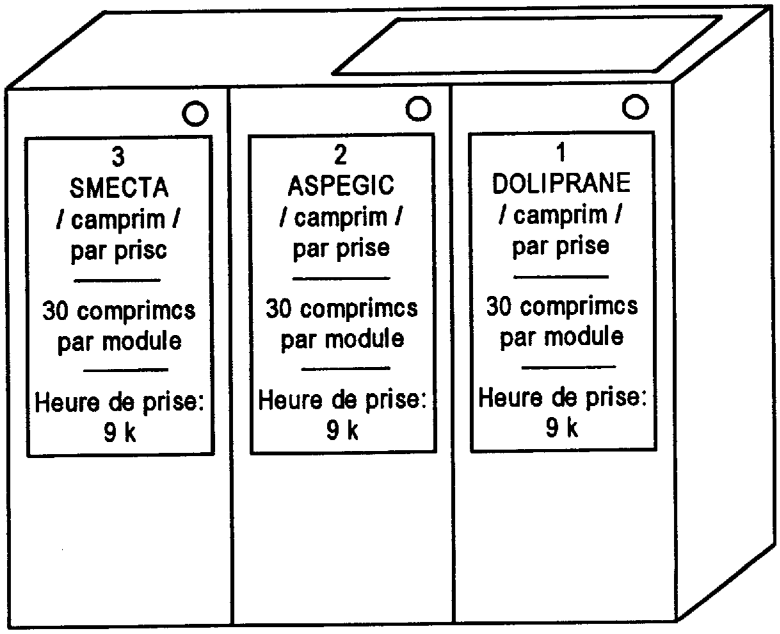
FIG. 5 is a perspective view of a modular pillbox having three compartments.

As illustrated in FIG. 5, the labels inserted into each pillbox compartment are easily seen to assure that the patient has human readable information about the kind of pills in each pillbox compartment, the quantity of pills initially in each compartment and the pill ingestion times.

While there has been described and illustrated a specific embodiment of the invention, it will be clear that variations in the details of the embodiment specifically illustrated and described may be made without departing from the true spirit and scope of the invention as defined in the appended claims.

What is claimed is:

1. A method of forming an electronic pocket pillbox having plural compartments for dispensing medications comprising writing prescription data into a computer memory loading the prescription data from the computer memory into a memory of a detachable data medium arranged to fit into the pillbox filling at least some of the compartments with medications of the type defined by the prescription, and inserting the detachable data medium into the pillbox.

2. The method of claim 1 wherein the compartments are manually detachable from each other and each includes a unit-medication dispenser for different medications having at least one of differing sizes and differing pharmaceutical forms, the filling step including inserting medications having at least one of differing sizes and differing pharmaceutical forms into the different compartments, and joining the compartments together to form the pillbox.

3. The method of claim 1 further including electronically reading the prescription data from the detachable data medium memory while the medium is in the pillbox and deriving dispensing signals for the medication based on the prescription data read from the detachable data medium memory.

4. The method of claim 3 wherein the pillbox includes a further memory separate from the memories of the computer and detachable data medium and the electronically reading step includes copying the prescription data contained in the memory of the detachable data medium into the further memory.

5. The method of claim 1 further comprising placing a gauge matched to the medication in each pillbox compartment in a dispenser of each compartment.

6. The method of claim 1 wherein the prescription writing step includes writing into the computer memory (a) a number for the compartment allotted to each medication, and (b) a size of a gauge to be inserted into a dispenser for each of the compartments.

7. The method of claim 1 wherein the step of loading the prescription data is initiated by a computer user selecting a "pillbox programming" function from a menu displayed by a display responsive to the computer.

8. The method of claim 2 further including providing one and only one compartment for each medication type, and filling each compartment with its associated medication.

* * * * *